United States Patent Office 3,535,268
Patented Oct. 20, 1970

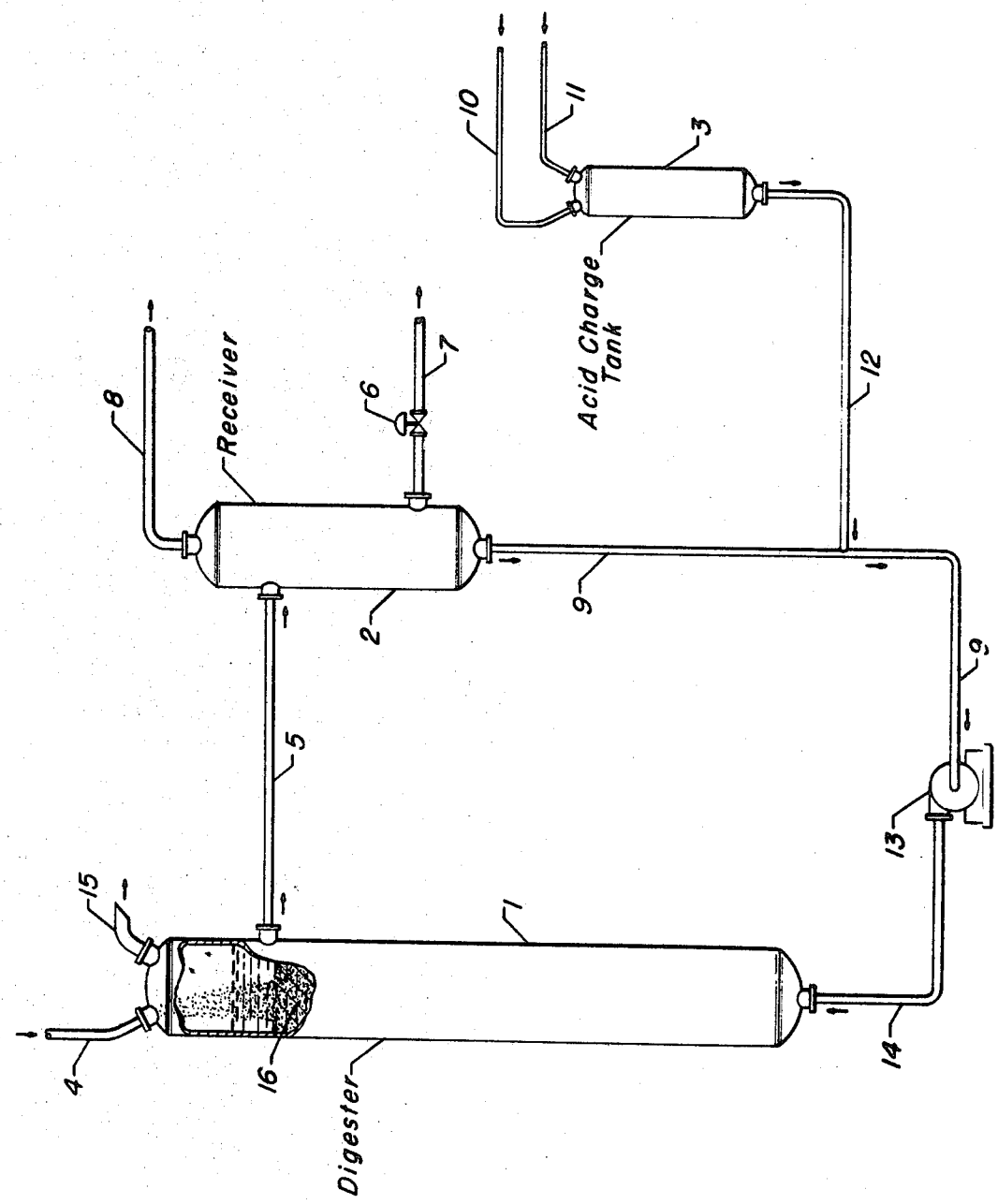

3,535,268
CONTINUOUS PROCESS FOR MANUFACTURE OF SOLS
John C. Hayes, Palatine, Ill., assignor to Universal Oil Products Company, Des Plaines, Ill., a corporation of Delaware
Continuation-in-part of application Ser. No. 647,761, June 21, 1967. This application June 10, 1968, Ser. No. 747,054
Int. Cl. B01j *11/32, 13/00;* C01f *7/42*
U.S. Cl. 252—313         5 Claims

ABSTRACT OF THE DISCLOSURE

A process for the continuous manufacture of an alumina sol. Aluminum particles are continuously charged to an aluminum digestion zone and digested in contact with hydrochloric acid admixed with recycled sol. The hydrochloric acid-sol mixture is processed in contact with the aluminum particles at conditions to obviate formation of undesirable high molecular weight sol polymers.

RELATED APPLICATIONS

This application is a continuation-in-part of a copending application Ser. No. 647,761, filed June 21, 1967, now abandoned.

BACKGROUND OF THE INVENTION

Alumina sol is utilized almost exclusively in the manufacture of alumina. However, the alumina product finds extensive use, particularly in the chemical and petroleum industries as dehydrating, treating and purifying agents, and especialy as a catalyst or a support for catalytic materials.

The alumina sol may be converted to alumina in many ways, virtually all of which require gelation of the sol and formation of a hydrogel which, upon drying, calcining and other miscellaneous processing steps, is converted to the desired alumina. Alumina is prepared in many shapes and sizes depending on the intended application. For example, a particularly useful form is the sphere. Spheres are suitably prepared by the technique of dispersing droplets of a suitable sol into a hot oil bath. The droplets are retained in the bath until they set into firm hydrogel spheroids. The spheroids are continuously separated from the bath and subjected to specific aging treatments to promote certain desirable physical properties. The spheres are subsequently dried at from about 100° to about 400° F. and thereafter calcined at about 800° to about 1400° F.

In the manufacture of catalysts comprising alumina, it is frequently desirable to include chlorine and/or fluorine, which components are thought to exist within the catalyst in a combined form, whereby a desired degree of acidity is imparted to the finished catalyst to influence particular reactions. Although the addition of either chlorine or fluorine may be effected in any suitable manner, such as by treating calcined alumina with hydrochloric acid, hydrofluoric acid, etc., a convenient method for adding the chloride is in the utilization of a sol formed by digesting aluminum in hydrochloric acid. Where necessary, the alumina subsequently produced therefrom may be treated with hydrochloric and/or hydrofluoric acid as aforesaid to add additional halogen, or treated with steam to lower the halogen concentration.

In the manufacture of catalysts it is extremely important to have complete control of all properties, physical and chemical, that may influence activity, selectivity and stability. Alumina sol is colloidal in nature and unusually difficult to characterize precisely. Slight variations in raw materials, methods and conditions of preparation, and storage conditions can cause very significant changes in the characteristics of the sol and catalyst and catalyst supports prepared therefrom.

The manufacture of alumina sol utilizing the method whereby aluminum is digested in hydrochloric acid has heretofore been effected in a batch type of operation. For example, an excess of aluminum is charged to a digestion vessel with water and hydrochloric acid. The acidic solution is circulated in the vessel in contact with the aluminum until the circulating solution contains a quantity of dissolved aluminum in excess of that desired in the final alumina sol product. The resulting acidic sol solution is then separated from the digestion vessel and the aluminum and the chloride concentrations adjusted to the desired level by the addition of hydrochloric acid and water. The acidic alumina sol retained on the undissolved aluminum particles continues to digest the aluminum and polymerize to a higher molecular weight sol polymer, the rate increasing with the molecular weight of the sol polymer becomes more difficult to separate from the undissolved aluminum particles with each succeeding operation. A sufficient amount of the higher molecular weight sol polylmer is recovered in the sol product to yield a sol which varies markedly in appearance characteristics such as color, translucence etc. Also, the inclusion of high molecular weight polymers in an alumina sol results in a product with a tendency to stratify into several distinct layers. Such stratification is indicative of a non-homogenous sol, and produces an alumina which is non-uniform as to composition and/or physical characteristics.

It is generally considered that a continuous type of operation is most effective to attain the desired process control. However, the formation of high molecular weight sol polymers which are detrimental to the batch type of operation have heretofore precluded a continuous type of operation wherein aluminum particles and hydrochloric acid are charged to a digestion vessel in a continuous manner with the continuous withdrawal of sol product. A batch type of operation presents an opportunity to treat the undissolved aluminum particles subsequent to the separation of the alumina sol product therefrom and prior to subsequent digestion in a succeeding batch type operation whereby the high molecular weight sol polymers are separated to obviate further polymerization. However, this is somewhat tedious process detracting from commercial applicability. In a continuous process, sol accumulation on the aluminum particles is a more aggravating problem since, by the nature of the process, there is no such opportunity to separate the high molecular weight sol polymers from the aluminum particles before they are digested to extinction. Consequently, the polymers continue to polymerize as evidenced by a milky-white precipitate in the sol product. The progressive growth of said sol polymers in contact with the aluminum particles in the digestion zone has heretofore effected substantially complete precipitation of the alumina in the digestion zone, usually within a period of 24–48 hours, making an operable continuous process virtually impossible.

It is therefore an object of this invention to present a novel process for the continuous manufacture of an alumina sol which obviates the formation of undesirable high molecular weight sol polymers and yields a sol product of improved homogeniety and reproducibility.

SUMMARY OF THE INVENTION

In one of its broad aspects, the present invention embodies a continuous process for manufacturing a sol which comprises charging hydrochloric acid to a digestion zone in admixture with sol recycled thereto, maintaining a flow of the acidic mixture through said digestion zone in contact with an excess of metal particles maintained therein and selected from the group consisting of aluminum, chromium, iron, zirconium, zinc, and gallium and digesting a portion of said particles with the formation of a sol and hydrogen, discharging the hydrogen, recovering a portion of the sol as product at a rate to insure an average residence time in said digester of from about 1 to about 12 hours, recycling the remaining sol to said digestion zone in admixture with hydrochloric acid and maintaining a recycle rate sufficient to establish a linear velocity of the acidic mixture through said digestion zone of at least about 1 foot per minute, the aforesaid metal particles being charged to said digestion zone at a rate to maintain a substantially constant inventory therein.

Other objects and embodiments of this invention will become apparent in the following detailed specification.

Pursuant to the process of this invention, an excess of the metal reactant is charged to and maintained in a digestion zone, with a mixture of hydrochloric acid and recycled sol being charged through the digestion zone in contact with the metal whereby the metal is digested with the formation of a sol. While the process of this invention is suitable for the manufacture of sols corresponding to the enumerated metals, the process is particularly applicable to the continuous manufacture of alumina sols and the further description of the process of this invention will be with respect thereto. The aluminum may be of any available commercial grade and particle size. Very pure aluminum, say of a purity of about 99.99%, reacts relatively slowly. However, a suitable reaction rate is accomplished utilizing aluminum turnings, or aluminum in a finely subdivided or powdered form, whereby maximum surface area is exposed to the acidic reactants. On the other hand, the reaction rate is increased substantially utilizing a relatively impure aluminum. For example, an aluminum of about 99.0–99.9% purity is considerably more reactive than the very pure aluminum and is more suitably employed, particularly in view of the fact that a substantially pure alumina sol may be produced therefrom by the expedient of passing the sol product or recycle stream through a magnetic field, iron being the principal impurity normally encountered. In the latter case, aluminum pellets of about ¼ to about ½ inch diameter, such as are conveniently prepared by dropping molten aluminum into water, have proven highly satisfactory.

Alumina sols of predetermined composition with respect to aluminum and chloride content as well as aluminum/chloride ratio are prepared by the process of this invention. Usually it is preferred to maintain the chloride level of the sol product at from about 8 to about 12 weight percent thereof. Sols that contain aluminum in excess of about 16 weight percent are highly unstable so that it is preferable to maintain the aluminum content at less than about 14 weight percent. The aluminum/chloride weight ratio of the sol product, which influences the physical properties of the ultimate alumina product, is usually maintained at from about 0.5 to about 2.0. The aluminum and the chloride content of the sol products as well as the aluminum/chloride weight ratio thereof is substantially equivalent to the quantity and ratio at which aluminum and hydrochloric acid are charged to the digestion zone and thus may be readily controlled, the aluminum being charged to the digestion zone and added to the excess contained therein at substantially the same rate as it is digested. If so desired, the aluminum and chloride content of the sol product can be altered by increasing or decreasing the rate of hydrochloric acid charged, or by increasing or decreasing the degree of dilution thereof. A dilute hydrochloric acid comprising from about 10% to about 35% hydrochloric acid, in aqueous solution is suitably employed.

According to the present process, the hydrochloric acid is charged to the digestion zone in admixture with alumina sol recycled thereto. The sol recycle rate should be sufficiently rapid to maintain a linear velocity of the acidic mixture through the digestion zone of at least about 1 foot per minute. The sol recycle rate required to establish a desired velocity is of course dependent on the cross-sectional area of the digester. The stated linear velocity is considered to be a minimum velocity and can be exceeded to the extent that process equipment permits without impairing the process of this invention. The superficial linear velocity may be as high as about 20 feet per minute. Above this value, it is believed that excessive pressure drop and attrition may be encountered. It should be noted that superficial linear velocity as used herein is defined as the apparent velocity of the recycling liquid past a given point in the digester, determined as if the digester were empty. As such, it is calculated by dividing the recycle rate y the column diameter. It, therefore, furnishes a method of relating recycle rate to digester size.

A portion of the sol digester effluent is recovered as product with the remainder being recycled to the digester as aforesaid. The product sol is recovered from the process at a rate equivalent to the rate at which the aluminum and hydrochloric acid reactants are charged to the digester, the product sol recovery being in any case sufficient to establish an average residence time of the sol in contact with the aluminum of from about 1 to about 12 hours, and preferably from about 4 to about 12 hours. It follows that the rate of sol product recovery will be dependent upon the capacity of the digester and the aluminum and acidic mixture inventory maintained therein.

Reaction conditions maintained in the digestion zone include a temperature of from about 125° F. to about 250° F., a temperature of from about 175° F. to about 225° F. being preferred. It is highly desirable to conduct a liquid phase operation and superatmospheric pressure may be employed to maintain substantially liquid phase conditions. Hydrogen, being a by-product of the aluminum digestion process, is employed advantageously to maintain a required pressure.

The novelty and utility of the process of the present invention is further illustrated with reference to the accompanying schematic drawing. It is not intended that the present invention be limited unduly to the particular system illustrated. Modifications to the equipment, and variations in the process, will become apparent with reference to the drawing as well as to the specification and example hereinafter set forth. In the interest of simplicity, various controls, heaters, coolers, most valves, sample taps, and other similar refinements have been either omitted in the drawing, or entirely omitted therefrom. These items are well-known and evident to one skilled in the art and need not be necessarily illustrated or described with great detail.

The schematic drawing shows an aluminum digester 1, a sol receiver 2, and an acid charge tank 3. In a lined-out operation, the digester will contain an inventory of unreacted aluminum pellets 16, said inventory being maintained by a flow of aluminum pellets through line 4 from a feed hopper not shown. The aluminum pellets are charged to the digester at a rate substantially equivalent to the rate of digestion therein. The digester also contains an upwardly flowing acidic mixture which exists from the digester as an alumina sol through line 5 to be transferred to the sol receiver 2. A liquid level is maintained in the sol receiver by means of a level controller 6 with alumina sol product being recovered through line 7 at a rate substantially equivalent to product make. An overhead line 8 is provided to vent any gaseous product carried to the receiver 2 by the sol stream. Alumina sol is continuously withdrawn from the receiver 2 by way of line 9 to be recycled to the digester. Dilute hydrochloric acid is charged to the process from the acid charge tank 3, water being charged to said tank through line 10, and hydrochloric acid through line 11 and admixed therein. The diluted acid is then charged through line 12 to be commingled with recycled alumina sol in line 9. The acidic mixture is then continued through line 9 by means of a recycle pump 13 and charged through 14 to the digester 1 to pass upwardly therethrough. Excess hydrogen formed in the digester is recovered overhead through line 15 at a rate to maintain the desired pressure in the digester.

The following example is presented in further illustration of the process of this invention and is not intended as an undue limitation on the generally broad scope of the ivention as set out in the appended claims.

Example 1

The following work was performed in an apparatus substantially as described and comprising a 480 cubic centimeter capacity tubular glass column 4 centimeters in diameter as a digester, a sol receiver equipped with a liquid level controller, and an acid charge tank. An aluminum inventory of about 2.53 pounds of undissolved aluminum pellets was maintained in the digester by the addition of 8.7 grams of fresh aluminum pellets per hour from an overhead hopper, the aluminum pellets being of 99.9% purity. A liquid inventory of about 0.13 gallon comprising alumina sol and freshly charged 10% hydrochloric acid solution was maintained in the digester. The sol was withdrawn from the top of the digester and charged to the sol receiver. The recycled sol was withdrawn from the receiver and recycled to the digester at a recycle rate of 0.16 gallon per minute. The hydrochloric acid, diluted to a 10% aqueous solution, was commingled with the recycled sol and the mixture processed upwardly through the digester at a liquid hourly space velocity of about 60 and a superficial linear velocity of about 1.56 feet per minute. The average residence time of the acidic mixture in contact with the aluminum particles was 10.1 hours. The sol product was continuously withdrawn from the sol receiver, the hydrogen by-product being discharged overhead through a wet test meter, and analyzed 13.77% aluminum with an aluminum chloride ratio of 1.40. The continuous operation ran for more than 50 days during which the sol product showed no tendency to stratify and was free of milky white precipitate indicative of high molecular weight sol polymers.

While the process of this invention has been described with reference to the digestion of aluminum and the manufacture of alumina sols, the process may be similarly employed in the manufacture of other sols normally derived from the digestion of a suitable metal in an acid media. For example, the process may be employed to effect the digestion of chromium, iron, zirconium, zinc, gallium, etc., to form the corresponding sols either per se or in combination with alumina.

I claim as my invention:

1. A continuous process for manufacturing a sol which comprises charging hydrochloric acid to a digestion zone in admixture with sol recycled thereto, maintaining a flow of the acidic mixture through said digestion zone in contact with an excess of metal particles maintained therein and selected from the group consisting of aluminum, chromium, iron, zirconium, zinc and gallium, and digesting a portion of said particles with the formation of a sol and hydrogen, discharging the hydrogen, recovering a portion of the sol as product at a rate to insure an average residence time in said digester of from about 1 to about 12 hours, recycling the remaining sol to said digestion zone in admixture with hydrochloric acid as aforesaid and maintaining a recycle rate sufficient to establish a linear velocity of the acidic mixture through said digestion zone of at least about 1 foot per minute, the aforesaid metal particles being charged to said digestion zone at a rate to maintain a substantially constant inventory therein.

2. The process of claim 1 further characterized in that said metal particles are aluminum.

3. The process of claim 2 further characterized in that said digestion zone is maintained at a temperature of from about 125° F. to about 250° F. and at a pressure to maintain substantially liquid phase reaction conditions.

4. The process of claim 3 further characterized in that said digestion zone is maintained at a temperature of from about 175° F. to about 225° F. and at a pressure to maintain substantially liquid phase reaction conditions.

5. The process of claim 4 further characterized in that said average residence time is from about 4 to about 12 hours.

References Cited

UNITED STATES PATENTS

| | | | |
|---|---|---|---|
| 2,690,432 | 9/1954 | Den Herder | 252—313 |
| 3,020,242 | 2/1962 | McCartney et al. | 252—313 X |

RICHARD D. LOVERING, Primary Examiner

U.S. Cl. X.R.

3—143; 252—317, 442, 448, 463